United States Patent
Ganeshmani

(10) Patent No.: US 11,681,791 B2
(45) Date of Patent: Jun. 20, 2023

(54) AUGMENTED REALITY GENERATED HUMAN CHALLENGE

(71) Applicant: Capital One Services, LLC, McLean, VA (US)

(72) Inventor: Jayaraman Ganeshmani, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 47 days.

(21) Appl. No.: 17/091,474

(22) Filed: Nov. 6, 2020

(65) Prior Publication Data
US 2021/0056189 A1 Feb. 25, 2021

Related U.S. Application Data

(63) Continuation of application No. 16/413,902, filed on May 16, 2019, now Pat. No. 10,860,705.

(51) Int. Cl.
| | |
|---|---|
| *G06F 21/36* | (2013.01) |
| *G06F 21/62* | (2013.01) |
| *G06F 3/04815* | (2022.01) |
| *G06T 15/60* | (2006.01) |

(52) U.S. Cl.
CPC .......... *G06F 21/36* (2013.01); *G06F 3/04815* (2013.01); *G06F 21/62* (2013.01); *G06T 15/60* (2013.01); *G06F 2221/2133* (2013.01)

(58) Field of Classification Search
CPC ...... G06F 21/36; G06F 3/04815; G06F 21/62; G06F 2221/2133; G06T 15/60; H04W 4/185
See application file for complete search history.

(56) References Cited

U.S. PATENT DOCUMENTS

| | | |
|---|---|---|
| 8,782,398 B2 | 7/2014 | Mirashrafi et al. |
| 9,147,061 B1 | 9/2015 | McClendon et al. |
| 9,432,193 B1 | 8/2016 | Mozer et al. |
| 9,537,859 B2 | 1/2017 | Liu et al. |
| 9,595,146 B2 | 3/2017 | Smith et al. |

(Continued)

OTHER PUBLICATIONS

Green SA, Billinghurst M, Chen X, Chase JG. Human-Robot Collaboration: A Literature Review and Augmented Reality Approach in Design. International Journal of Advanced Robotic Systems. Mar. 2008. doi:10.5772/5664 (Year: 2008).*

(Continued)

*Primary Examiner* — Jung W Kim
*Assistant Examiner* — Sameera Wickramasuriya
(74) *Attorney, Agent, or Firm* — Hunton Andrews Kurth LLP

(57) ABSTRACT

A human challenge can be presented in an augmented reality user interface. A user can use a camera of a smart device to capture a video stream of the user's surroundings, and the smart device can superimpose a representation of an object on the image or video stream being captured by the smart device. The smart device can display in the user interface the image or video stream and the object superimposed thereon. The user will be prompted to perform a task with respect to one or more of these augmented reality objects displayed in the user interface. If the user properly performs the task, e.g., selects the correct augmented reality objects, the application will validate the user as a person.

20 Claims, 6 Drawing Sheets

(56) References Cited

U.S. PATENT DOCUMENTS

| | | |
|---|---|---|
| 9,864,854 B2 | 1/2018 | Mantri et al. |
| 9,985,943 B1 | 5/2018 | Reading et al. |
| 2007/0038944 A1 | 2/2007 | Carignano et al. |
| 2011/0154444 A1* | 6/2011 | Sriraghavan ............ G06F 21/36 |
| | | 345/157 |
| 2012/0291122 A1 | 11/2012 | Chow et al. |
| 2013/0086674 A1 | 4/2013 | Horvitz et al. |
| 2013/0239206 A1 | 9/2013 | Draluk et al. |
| 2013/0267204 A1 | 10/2013 | Schultz et al. |
| 2014/0026157 A1 | 1/2014 | Wang et al. |
| 2014/0028712 A1* | 1/2014 | Keating ................ A63F 13/211 |
| | | 345/633 |
| 2014/0043433 A1 | 2/2014 | Scavezze et al. |
| 2014/0125574 A1* | 5/2014 | Scavezze ................ G10L 15/22 |
| | | 345/156 |
| 2014/0226000 A1 | 8/2014 | Vilcovsky et al. |
| 2014/0282956 A1 | 9/2014 | Kennedy et al. |
| 2015/0347826 A1 | 12/2015 | Dugan et al. |
| 2016/0180073 A1* | 6/2016 | Zhou ........................ G06F 21/44 |
| | | 726/27 |
| 2016/0197918 A1 | 7/2016 | Turgeman et al. |
| 2016/0294835 A1 | 10/2016 | Beaumont et al. |
| 2016/0350761 A1 | 12/2016 | Raziel et al. |
| 2017/0024556 A1 | 1/2017 | Akula et al. |
| 2017/0032114 A1 | 2/2017 | Turgeman |
| 2017/0076000 A1 | 3/2017 | Ashoori et al. |
| 2017/0104740 A1* | 4/2017 | Hoy .................... H04L 63/1441 |
| 2017/0161477 A1 | 6/2017 | Liu et al. |
| 2017/0161479 A1 | 6/2017 | Zhou |
| 2017/0180348 A1* | 6/2017 | Piccolotto ............. G06V 40/45 |
| 2017/0180362 A1 | 6/2017 | Du |
| 2017/0199994 A1* | 7/2017 | Shalev .................... G06F 21/36 |
| 2017/0289146 A1 | 10/2017 | Hong et al. |
| 2018/0158060 A1 | 6/2018 | Adams et al. |
| 2018/0276895 A1 | 9/2018 | Hodge |
| 2018/0285682 A1* | 10/2018 | Najibi ..................... G06V 20/10 |
| 2018/0314816 A1* | 11/2018 | Turgeman ............... G06F 21/40 |
| 2018/0341779 A1* | 11/2018 | Sawant .................... G06F 21/31 |
| 2019/0028637 A1* | 1/2019 | Kolesov ................. G06V 10/24 |
| 2019/0114061 A1 | 4/2019 | Daniels et al. |

OTHER PUBLICATIONS

S. Cai, X. Wang, M. Gao and S. Yu, "Simulation Teaching in 3D Augmented Reality Environment," 2012 IIAI International Conference on Advanced Applied Informatics, 2012, pp. 83-88, doi: 10.1109/IIAI-AAI.2012.25. (Year: 2012).*

K. Rohmer, W. Büschel, R. Dachselt and T. Grosch, "Interactive near-field illumination for photorealistic augmented reality on mobile devices," 2014 IEEE International Symposium on Mixed and Augmented Reality (ISMAR), Munich, Germany, 2014, pp. 29-38. (Year: 2014).*

Polakis et al., "All your face are belong to us: breaking Facebook's Social Authentication", Proceedings of the 28th Annual Computer Security Applications Conference, (Year: 2012), pp. 399-408.

Azuma et al., "Recent advances in augmented reality," in IEEE Computer Graphics and Applications, vol. 21, No. 6, pp. 34-47, Nov.-Dec. 2001 (Year: 2001).

* cited by examiner

AUGMENTED REALITY GENERATED HUMAN CHALLENGE

CROSS REFERENCE TO RELATED APPLICATION

This application is a continuation of U.S. patent application Ser. No. 16/413,902 filed May 16, 2019, the complete disclosure of which is incorporated herein by reference in its entirety.

BACKGROUND

A human challenge or a completely automated public Turing test to tell computers and humans apart ("CAPTCHA") is a type of challenge-response test used in computing to determine whether or not the user is human. For example, distorted text can be used as CAPTCHA because humans can read distorted text, but many computer programs can't. There can be various uses for CAPTCHA. In many applications, it is important to establish that the user is a person. In the context of account registration, for example, ensuring that accounts are created by real humans can prevent creation of fake accounts. Similarly, in the context of displaying contact information and email addresses on the web, many scrapers search for and gather this information for spamming purposes. If an email address can be shown only to people, spamming can be reduced. Human challenges can also protect online polls from fake votes and prevent dictionary attacks against online accounts.

Augmented reality is an enhanced version of reality where live direct or indirect views of physical real-world environments are augmented with superimposed computer-generated images over a user's view of the real-world. Sometimes, augmented reality includes computer-generated perceptual information across multiple sensory modalities, including visual, auditory, haptic, somatosensory, and olfactory. Augmented reality can enhance one's current perception of reality.

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine tuning the model parameters using input data.

SUMMARY

Current human challenges have several drawbacks. Software bots have become very sophisticated these days. With advances in machine learning techniques, bots can easily guess the correct response to some human challenges. For example, it has become relatively easy for bots to ascertain distorted text. Similarly, bots are now capable of listening to recordings and transcribe them. Moreover, the consumers of these challenges are computer users and website visitors who have no choice but to spend time completing boring tasks. As these challenges are used on an ever-increasing number of websites, the users encounter them more frequently. However, they do not enjoy completing these tasks as the users feel they are a waste of their time. Therefore, it is an object of this disclosure to describe a novel and interactive human challenge which can address the shortcomings of the current human challenges. Specifically, it is an object of this disclosure to describe a human challenge which is difficult to predict for the current bots but enjoyable to complete for the users.

In one example embodiment, a human challenge can be presented in an augmented reality user interface. Specifically, augmented reality can be used to superimpose virtual objects (or augmented reality objects) on an image or video stream captured by a camera (e.g., in real time). For example, a user of a smart device (e.g., a smartphone, a tablet, smart glasses, a wearable device, or the like) can use a camera of the smart device to capture a video stream of the user's surroundings, and the smart device (or an augmented reality application running on the smart device) can superimpose a representation of an object (e.g., an augmented reality object) on the image or video stream being captured by the smart device. The smart device can display in the user interface the image or video stream and the object superimposed thereon. The user will be prompted to perform a task with respect to one or more of these augmented reality objects displayed in the user interface. If the user properly performs the task, e.g., selects the correct augmented reality objects, the application will validate the user as a person.

In one example embodiment, the smart device can execute an application which includes a page that requires the user to respond to a human challenge. The application can include a button for initiating the challenge. Upon initiation of the challenge, the application can activate a camera of the smart device. The application can display, in real time, an image or video stream captured by the camera (the "background"). The application can display a prompt to the user, which specifies a task to be performed by the user if the user desires to bypass or complete the human challenge. The application can also display a plurality of augmented reality objects superimposed on the background. If the user performs the specified task with respect to the augmented reality objects, the application can allow the user to navigate to the next page. Otherwise, the user can be displayed another human challenge (or the application can be locked).

In one example embodiment, the augmented reality objects can be images or visual representation of objects. Each augmented reality object can have at least one attribute and the prompt can ask the user to identify at least one object with a specific attribute. For example, the interface can display augmented reality animals, and the prompt can ask the user to identify augmented reality dogs. If the user selects the augmented reality dogs displayed in the user interface, the user will be allowed to open an account on the application.

In one example embodiment, the application can display the augmented reality objects in a 3-D space. The camera in its initial position, i.e., initial field of view, can capture only part of the 3-D space. Some of the augmented reality objects can appear in the initial field of view displayed in the user interface, but some of the augmented reality objects require the user to change the field of view (e.g., by rotating or tilting the smart device). Once the initial field of view is changed, the camera can capture other parts of the 3-D space, and thus, the user interface can display other augmented reality objects. The user can successfully complete the prompt only if the user selects all the objects specified by the prompt, which can include objects in parts of the 3-D space not displayed in the initial field of view.

In one example embodiment, the application can include a light source detection module. Using this module, the application can determine the coordinates of a light source. The application can also determine a direction or vector for the light emanating from the light source. Based on this detected direction, the application can determine and display shades or shadows for augmented reality objects. The application can ask the user to identify objects which include the correct shade or shadow. For example, some of the objects can have their shadows displayed on the left side but others can include shadows displayed on the right side. The user can successfully complete this prompt by selecting the objects that include shadows on, e.g., the left side (if the light source is on the right side).

DETAILED DESCRIPTION

In an example embodiment, a smart device can store and execute a program application ("application"). The application, when executed, can show a user interface in a display of the smart device. The user interface can display various pages and receive input from the user by, e.g., tactile user interaction with the display of the smart device. The application can also include a module for determining whether a user of the application is a person (and not a bot or computer). This module can cause the application to display an augmented reality interface for this purpose. In one embodiment, the application can be a standalone application for the sole purpose of verifying that the user is a person. In another embodiment, the application can include other features. For example, the application can be an email application with the capability to open a new email account and sign the user in the account. As another example, the application can be a bank application with the capability to sign the user in the user's bank account and display the user's financial information.

Figure 1:
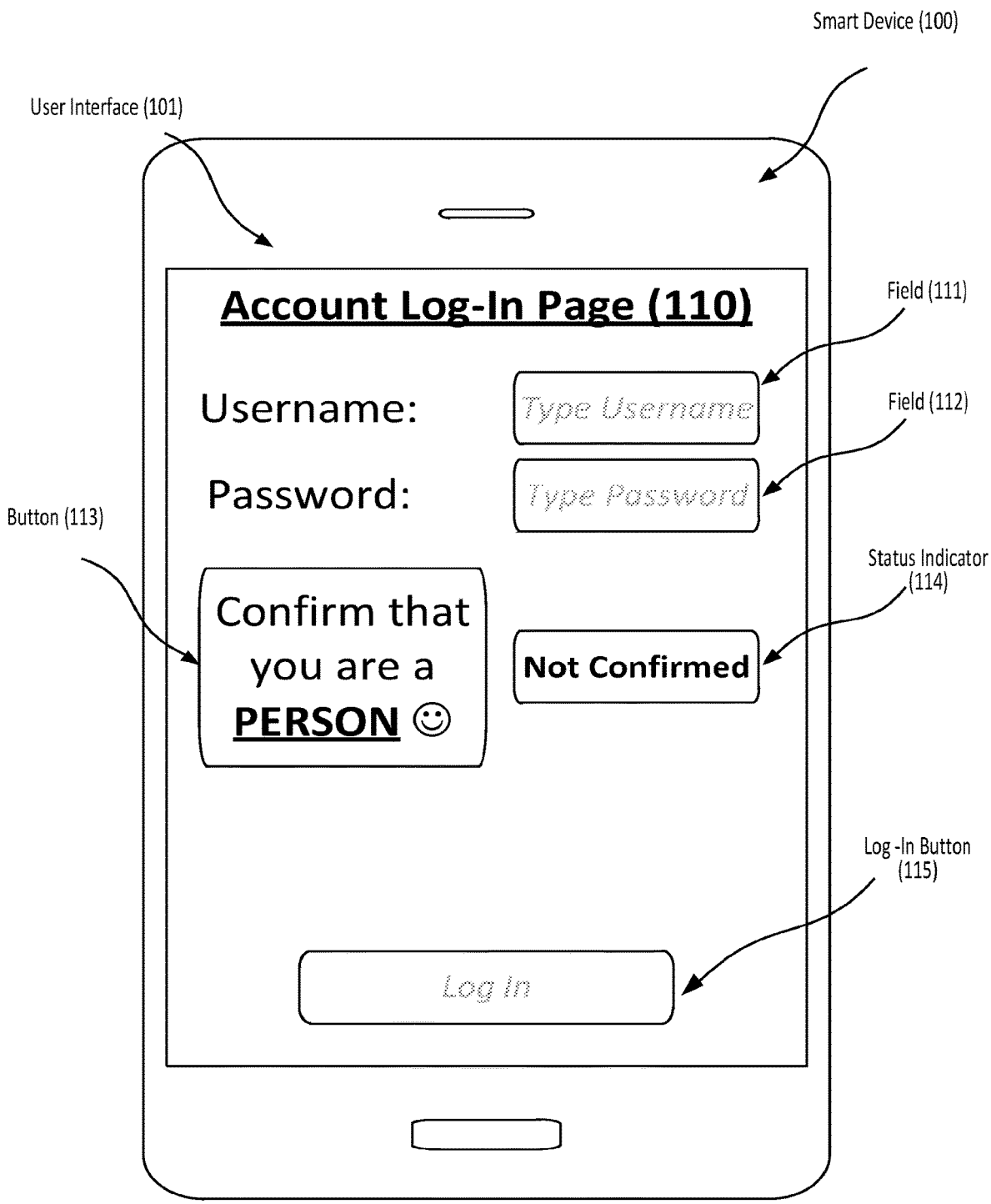
FIG. 1 shows an example account log-in page for an application associated with an email service.

FIG. 1 shows an example account log-in page 110 for an application associated with an email service. The application allows the user to access the user's email account using a username and password. The application is configured to display a user interface 101 in the display of a smart device 100. The account log-in page 110 can include a field 111 for receiving a username, a field 112 for receiving a password and a log-in button 115 for logging in the account. The page 110 can also include a visual indicator for activating a human challenge. In this example embodiment, the user will not be able to log in the user's account unless the user confirms that the user is a person. The user can confirm this by activating and successfully completing the human challenge.

The visual indicator can be a button, field, image, media file, etc. Although this example embodiment includes a visual indicator for activating the human challenge, in some examples, the human challenge can be automatically activated. For example, the human challenge can be activated when the user interface 101 displays the page 100. As another example, the human challenge can be activated when the user fills out the information in fields 111 and 112. As yet another example, the human challenge mode can be activated when a user scans a QR code using the camera of the smart device.

In this example, the visual indicator can be a button 113. When the user taps on the button 103, the human challenge mode can be initiated, e.g., the application can turn the camera on to capture an image or video stream. The application can display the image or video stream captured by the camera in the user interface 101. This image or video stream can be called the "background." For example, for a user sitting in a living room, when the user taps on the button 113, the camera can capture what is in the field of view of the camera, e.g., a couch, table and carpet. The user can change the field of view of the camera, for example, by tilting, rotating or swaying the camera. The page 110 can also include a status indicator 114 for displaying the status of the human challenge. Here, the status is "not confirmed," which indicates that the user has not confirmed that the user is a person.

In an example embodiment, in the human challenge mode, the application can superimpose augmented reality objects over the background (or video stream). The augmented reality objects can be drawings, images, photos, GIFs, animations, videos, media files, writings, etc. The augmented reality objects can resemble physical objects or things. For example, an augmented reality object can be a car, boat, dog, etc. The augmented reality objects can be selected randomly or they can be chosen based on the objects that appear in the background. In one embodiment, the augmented reality objects can be selected based on a location of the smart device or a scene of the background. In another embodiment, a server can transmit to the smart device the augmented reality objects to be displayed to the user.

Figure 2:
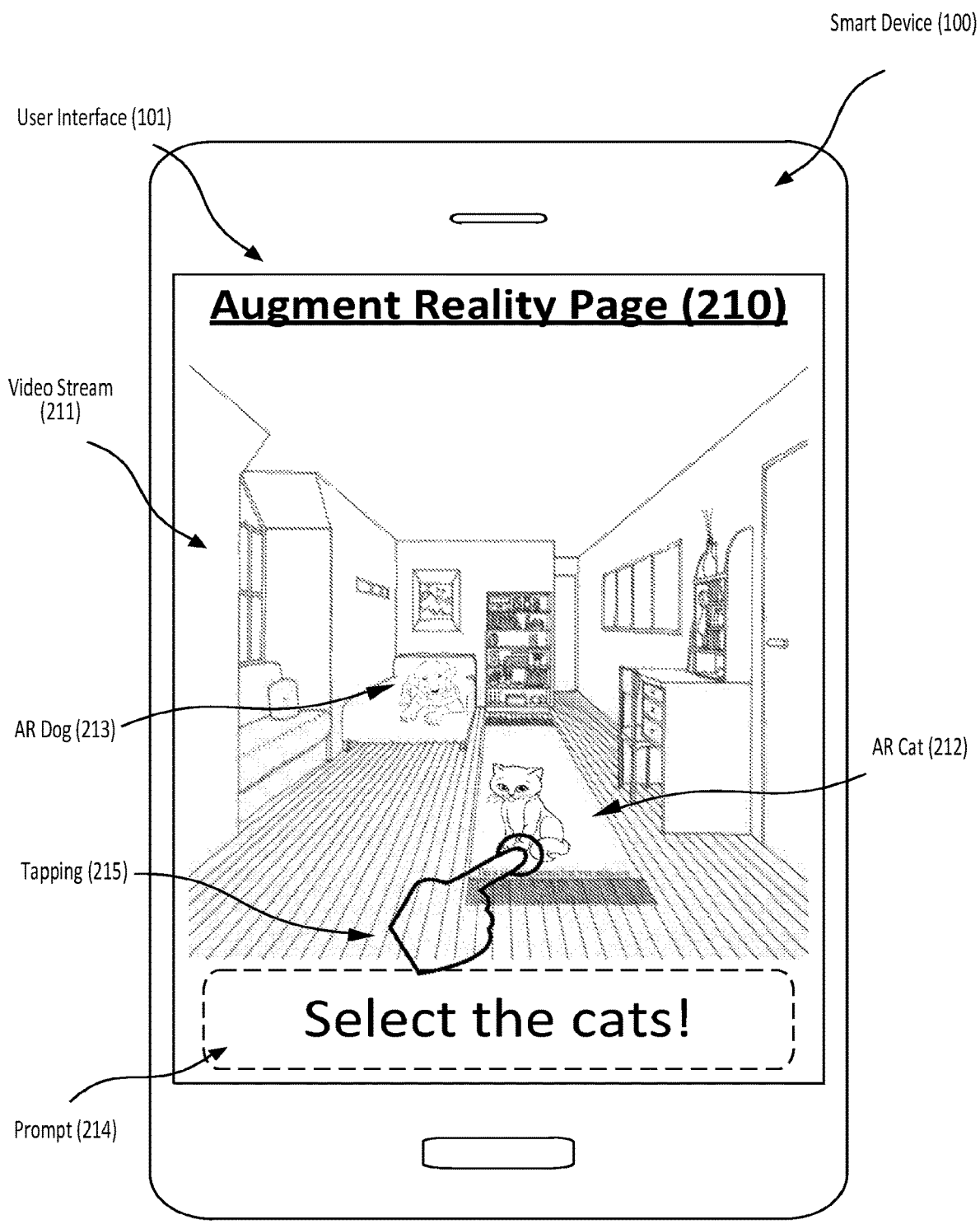
FIG. 2 shows an example activated human challenge mode in an exemplary user interface.

FIG. 2 shows an example activated human challenge mode in the user interface 101. In this example embodiment, the camera of the smart device 100 is activated (e.g., by pressing the button 113) and captures a video stream from a bed room. The user interface 101 shows an augmented reality page 210, which displays the video stream 211 from the bed room. The page 210 can also display a plurality of augmented reality objects. For example, an augmented reality cat 212 and an augmented reality dog 213 are displayed on the page 210. The page 210 can also display a prompt 214, which in this case asks the user to identify all the cats displayed on page 210. In this example, the user can select the cat 212, e.g., by tapping 215 on the augmented reality cat 212. Upon tapping 215 on the augmented reality cat 212, the application can receive this input and determine whether the user's selection is responsive to the task specified in prompt 214. If the selection is responsive to the task (which in this case is), the application can determine that the human challenge mode is completed. The user interface 101 can, for example, display the account log-in page 110 with the status indicator stating "confirmed." If the selection is not responsive to the task, the application can determine that the user has failed the human challenge. In response, the application can take one or more steps. For example, the application can take the user back to the account log-in page 110 and continue to display the "not confirmed" status indicator 114. In one embodiment, the application can rerun the human challenge mode with a new prompt and augmented reality objects.

The application can display a variety of prompts to the user. In one example embodiment, the prompt can task the user to select certain augmented reality objects displayed in the video stream. For example, each augmented reality object can include at least one attribute and the prompt can ask the user to select the augmented reality objects with a specific attribute (e.g., all augmented reality objects are animals and the prompt asks the user to select cats). In another example embodiment, the prompt can ask the user to drag and/or drop certain visual objects displayed in the video stream. For example, the prompt can ask the user to drag misplaced augmented reality objects, e.g., drag a fish placed on sand into water. In yet another example embodiment, the task can be drawing a shape or object over an augmented reality object or between two augmented reality objects, e.g., circle around cats or draw an "S" connecting two cats. In yet another example embodiment, the prompt can ask the user to select certain augmented reality objects in a specified sequence. For example, the prompt can ask the user to select cats before identifying dogs.

There can be various techniques for a user to respond to a prompt. For example, if the prompt asks the user to select augmented reality objects with a specific attribute, the user can tap or click on the objects which have the attribute. As another example, the user can select an augmented reality object by drawing a circle around the object. As yet another example, the user can draw a connection between two or more objects. For example, the user can connect the object that appears to be closest (to the user) to the object that appears to have the longest distance from the user. The user can connect the objects by, e.g., sliding the user's finger on the touchscreen of smart device, or tapping the user's finger on the touchscreen of the smart device. When the user taps the user's finger on the touchscreen, the tapping can create a pattern on a space between the objects. The smart device can determine if this pattern matches a pattern asked of the user in a prompt, e.g., draw a semicircle by tapping between the objects. As another example, a user can drag or drop an object. For example, a prompt can ask a user to place objects where they logically belong to, e.g., if the user interface displays a fish on a beach, the user can drag the fish and drop the fish in the water.

As yet another example, the user can type a description of the object responsive to the prompt, e.g., there is a dog on the bed. The application can include a natural language processing module which can determine the intent of the user's statement. The application can also include an object recognition module. The application can display an augmented reality object over an object that the application has recognized in the application. For example, the user is in a bedroom and the application can recognize a bed in the bedroom. The application can display a dog over the bed in the bedroom. The prompt can ask the user to identify the dogs in the user interface. The user interface can include a field for providing a narrative input to the application. Once the user provides the narrative input, the natural language processing module can evaluate the narrative. For example, the user can provide the name of an augmented reality object and the name of an object in the background in the narrative, e.g., there is a white dog on the bed. If the natural language processing module determines that the narrative includes an association between the augmented reality object (e.g., white dog) and the object in the background (e.g., bed), and that the augmented reality object (e.g., white dog) corresponds to the prompt (e.g., identify dogs), the module can decide that the user has properly described an augmented reality object in the narrative, and as a result, the application can determine that the user has completed the human challenge. As another example, the module can decide that the user has properly described an augmented reality object in the narrative when the user mentions only the background object.

In one example embodiment, the application or a server in communication with the application can determine whether the user's selection in response to the prompt is appropriate. For example, the application can determine whether the augmented reality objects selected by the user correspond to the task specified in the prompt. In one embodiment, the smart device can store a database of augmented reality objects, prompts and the correct selections in response to the prompts. The application can select the augmented reality objects and prompts from this database. If the user selects augmented reality objects that are responsive to the prompt (as specified by the database), the application can determine that the user has properly completed the human challenge. In one embodiment, the application is configured to receive the augmented reality objects and prompts from a server (i.e., the server includes the database). The server can also specify which selections are appropriate in response to the prompt. If the user selects the augmented reality objects specified by the server, the application can determine that the user has completed the human challenge.

Figure 3:
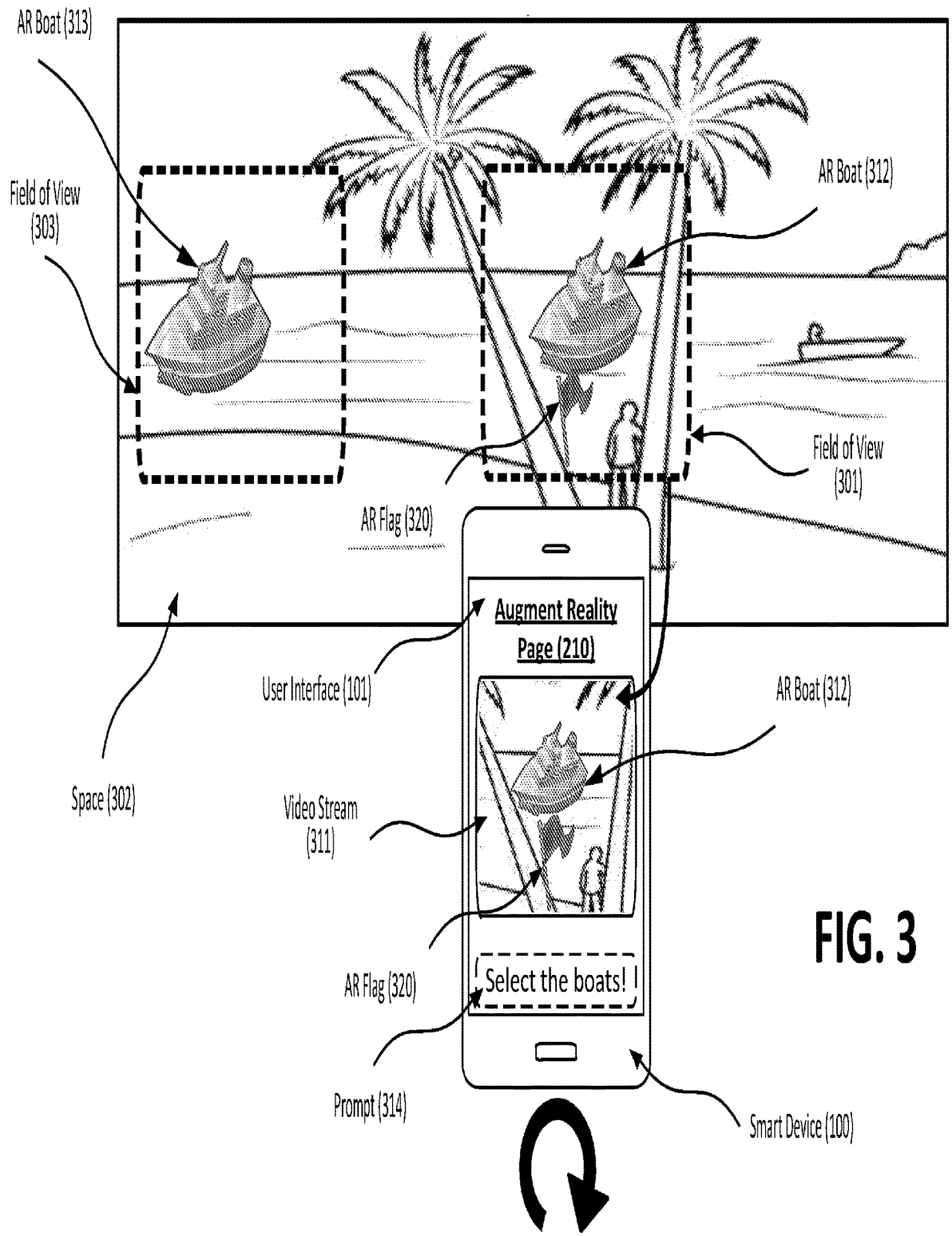
FIG. 3 shows an example human challenge mode in which some of the augmented reality objects can be displayed outside of the original field of view of the camera.

FIG. 3 shows an example human challenge mode in which some of the augmented reality objects can be displayed outside of the original field of view of the camera. In this example embodiment, the user is on a beach. The user can activate the human challenge mode by, e.g., pressing the button 113. As a result, the user interface 101 can display a video stream 311 on the augmented reality page 201.

Figure 4:
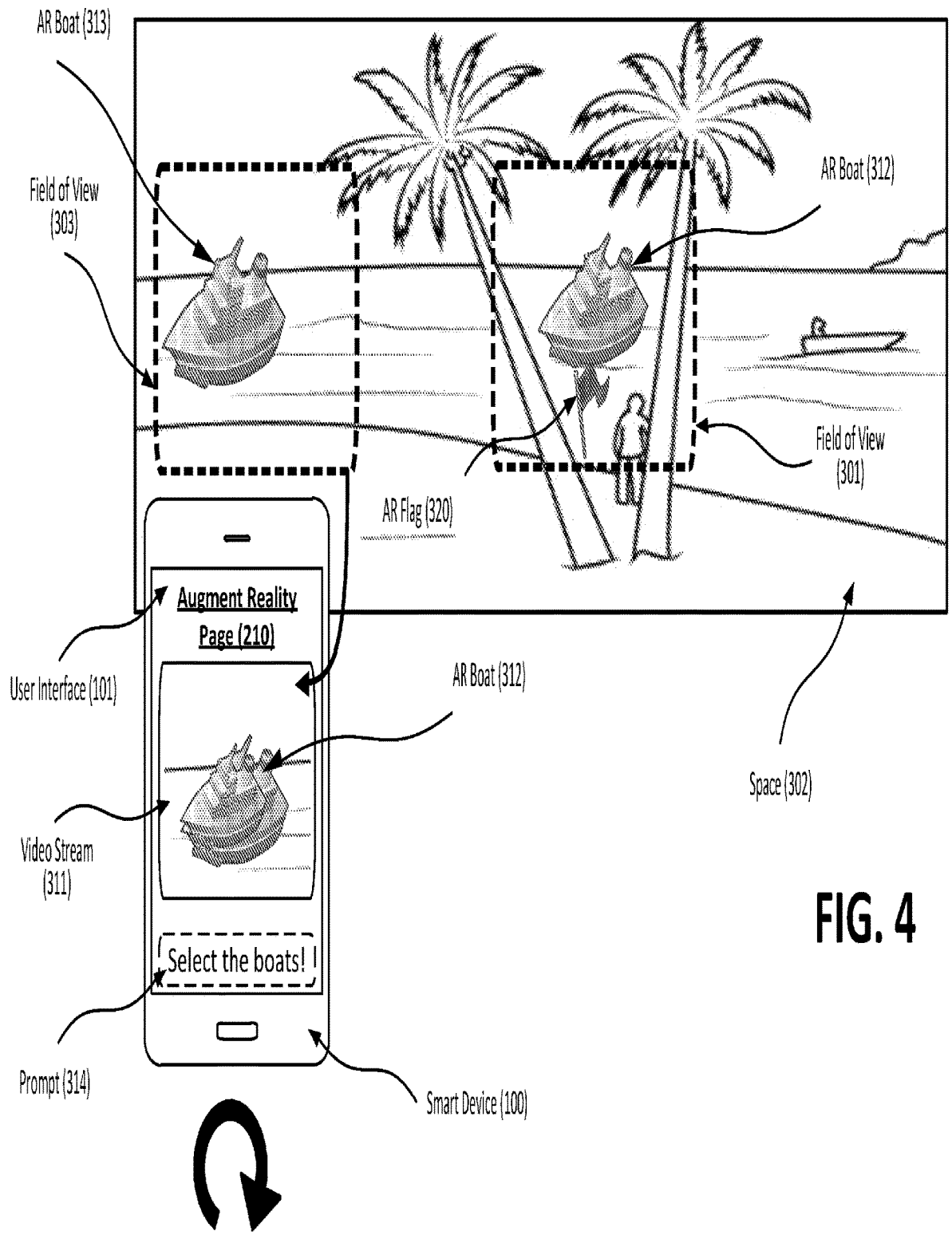
FIG. 4 shows an example field of view including an augmented reality object in the user interface.

Initially, the user can point the smart device 100 at a field of view 301 and the user interface 101 can display the field of view 301 in the video stream 311. The application can superimpose an augmented reality boat 312 on the field of view 301 and the user interface 101 can display the augmented reality boat 312 in the video stream 311. The user can move the smart device 100 and capture a different part of the space 302. For example, if the user rotates the smart device 100 to the left, the user can capture the field of view 303. Once the user interface 101 displays the field of view 303, the application can superimpose an augment reality boat 313 on the field of view 303 and the user interface 101 can display the augmented reality boat 313. FIG. 4 shows an example field of view 303 including an augmented reality boat 312 in the user interface 101. In this example, the user has changed the field of view 301 to the field of view 303.

In FIG. 3, the prompt 314 asks the user to select the boats. The user can select the augment reality boat 312 when the smart device 100 is pointing at the field of view 301, e.g., by tapping on the augmented reality boat 312. The user can rotate the smart device 100 to the left and observe the augmented reality boat 313 (FIG. 4). Then, the user can select the augment reality boat 313, e.g., by tapping on the augmented reality boat 313. Once the user makes the selections, the application can determine whether the user is a person. For example, if the user selects both augmented reality boats 312 and 313, the application can indicate that the user is a person. Otherwise, if the user fails to select these boats or incorrectly selects, e.g., the augmented reality flag 320, the application can determine that the user was not able to successfully complete the task. In response, the application can display another human challenge or end the human challenge mode (to prevent the user from advancing in the application).

Components of the Human Challenge Mode

In one example embodiment, the application of the smart device can determine the components of the human challenge mode, e.g., augmented reality objects, prompts and correct responses. For example, the application of the smart device can determine the augmented reality objects and prompts displayed in the user interface of the smart device. The application can also make the determination of whether the user has selected the augmented reality objects that correspond to the task identified in the prompt. In another example embodiment, a server in communication with the smart device can determine the components of the human challenge mode. For example, the application can transmit a signal to the server, and in response, the server can transmit to the smart device the components of the human challenge mode, e.g., the augmented reality objects, prompt, and correct selections. In yet another example embodiment, the smart device and the server can jointly determine the components of the human challenge mode. For example, the application can transmit to the server a video snippet of the video stream. Based on the video stream, the server can determine a theme for the components. The server can transmit the theme to the smart device and based on the theme the smart device can determine the augmented reality objects and prompts displayed to the user.

In an example embodiment, the application of the smart device or the server can include an object recognition module. For example, the module can receive a video feed from the camera of the smart device and determine one or more objects in the video feed. Based on the identity of these objects detected in the video feed, the application of the smart device or the server can determine the components of the human challenge. For example, the object recognition module can detect several indoor objects, such as a door, carpet, table and chair, in the user's environment. The application or server can determine to display augmented reality objects related to these indoor objects, e.g., an indoor pet such as a parrot. As another example, the object recognition module can detect a tree, and the application of the smart device or server can determine to display a fruit on the tree as an augmented reality object.

In an example embodiment, the application can feed the video stream into a machine learning model for detecting the objects included in the video stream. The machine learning model can be designed to identify objects or certain types of objects. The model can be trained using many photos of many objects. Once a video stream is provided to the model, the model can return one or more identification names and a probability value associated with that identification. For example, the model can specify that a vehicle is included in the video stream and the vehicle is a Porsche Cayenne 2018 with a probability of 80% or it is a Lamborghini Urus with a probability of 20%. The machine learning model of this disclosure can be stored on the smart device. However, in some embodiments, the model can be stored on the server, and the smart device can transmit the video stream to the server for identification of objects included therein.

In an example embodiment, after determining the identity of the object, the application can conduct an online search for determining objects related to the detected object. The application can choose the augmented reality objects based on the search results.

In one example embodiment, the application of the smart device or the server can include a scene recognition module. For example, the module can receive a video feed from the camera of the smart device. The video feed can be received before the human challenge is activated or even after the challenge is activated. In one embodiment, the camera provides the video feed to the module in the background such that the user does not notice this provisioning of the video feed to the module. The module can analyze this video and determine a scene provided in this video feed. For example, in one embodiment, the module can determine that the scene depicts a beach. The module can provide this information to the application of the smart device, and the application can determine to display augmented reality objects related to a beach, e.g., a boat and a flag. As another example, the module can determine that the scene is an indoor shopping area. In response to this determination by the module, the application can display a shopping cart as an augmented reality object and the prompt can ask the user to identify shopping carts.

In one example embodiment, the application of the smart device can include a module for determining the location of the smart device and the application or the server can determine the human challenge components based on the location of the smart device. For example, the application can determine the location of the smart device based on a GPS signal received at the smart device. As another example, the application can determine the location of the smart device based on a Wi-Fi signal received at an indoor location. As yet another example, the application can determine the location of the smart device based on an inaudible signal detected at the smart device. Using the location information, the application or the server can determine the components of the human challenge. For example, if the application determines that the user is in a restaurant, the application can choose to display augmented reality objects relating to a restaurant, e.g., various types of food, and the prompt can be to select a specific type of food, e.g., pizza.

In one example embodiment, in determining the components of the human challenge mode, in addition to using location-based data, the application can use sensory information provided by the smart device. For example, the smart device can utilize a compass, a gyroscope, and an accelerometer to provide data for determining the components of the human challenge. This data then determines what augmented reality objects are displayed to the user, e.g., depending on which side of the street the user is facing.

3-D Space Construction

In an example embodiment, the application can detect a ground plane (or a horizontal plane) in the video stream displayed on the user interface of the smart device. This detection can allow the application to place augmented reality objects on the ground plane (or the horizontal plane), e.g., a dog on the floor and a cat on the bed. There can be various techniques for detecting the ground plane. In one technique, the application can detect a few points on a plane in the video, and if those points have the same features, that plane can be recognized as the ground plane. Specifically, using feature extraction through visual processing, the application can extract certain features in the images and use the extracted features to establish certain points which are coplanar. If the application establishes that the extracted points are coplanar, then the application can establish that the plane on which these points are located is the ground plane. The grouping of the feature points and the orientation of the phone can assist in determining the ground plane. Some of the smart device's sensors can also be used in this process. For example, an accelerometer and a gyroscope can provide data to the application to facilitate the ground plane detection.

In another technique, the application can identify a horizontal plane in an image being captured by the smart device. The application can decide to display augmented reality objects only on the horizontal plane (e.g., to give the augmented reality objects a realistic appearance). The application can further determine a size of the horizontal plane, and may determine that the size of the horizontal plane satisfies a threshold value. Based on the size of the horizontal plane, the application of the smart device can determine what augmented reality objects to display on the horizontal plane. For example, the application can display only a pet on a smaller horizontal plane, but the application can display a car on the ground plane.

In one example embodiment, the application can construct a 3-D model of the space in front of the user. For example, the user can initially scan the space and the application can construct a 3-D model of the scanned space. The application can include a database of attributes for augmented reality objects. Based on the 3-D model and information provided in the database, the application can place the augmented reality objects in logical places for these augmented reality objects. For example, the 3-D model can include information about the horizontal and vertical surfaces. The application can place the augmented reality objects that usually rest on horizontal surfaces on a horizontal surface and the augmented reality objects that usually rest on vertical surfaces on a vertical surface. In this example, the application can determine that the user is in an indoor space, and thus, the application can decide to display indoor items to the user. The application can decide to show a frame on a wall of the indoor space (i.e., vertical surface) and the application can decide to display a dog on a bed (i.e., horizontal surface).

In one example embodiment, the 3-D model can include information relating to a light source. For example, a module of the application can determine a light source in the video stream provided by the camera. Using the information relating to the light source, the application can display augmented reality objects with shadows. The application can display certain objects with correct shadows and certain other objects with incorrect shadows. The prompt can ask the user to identify the objects with correct shadows.

Figure 5:
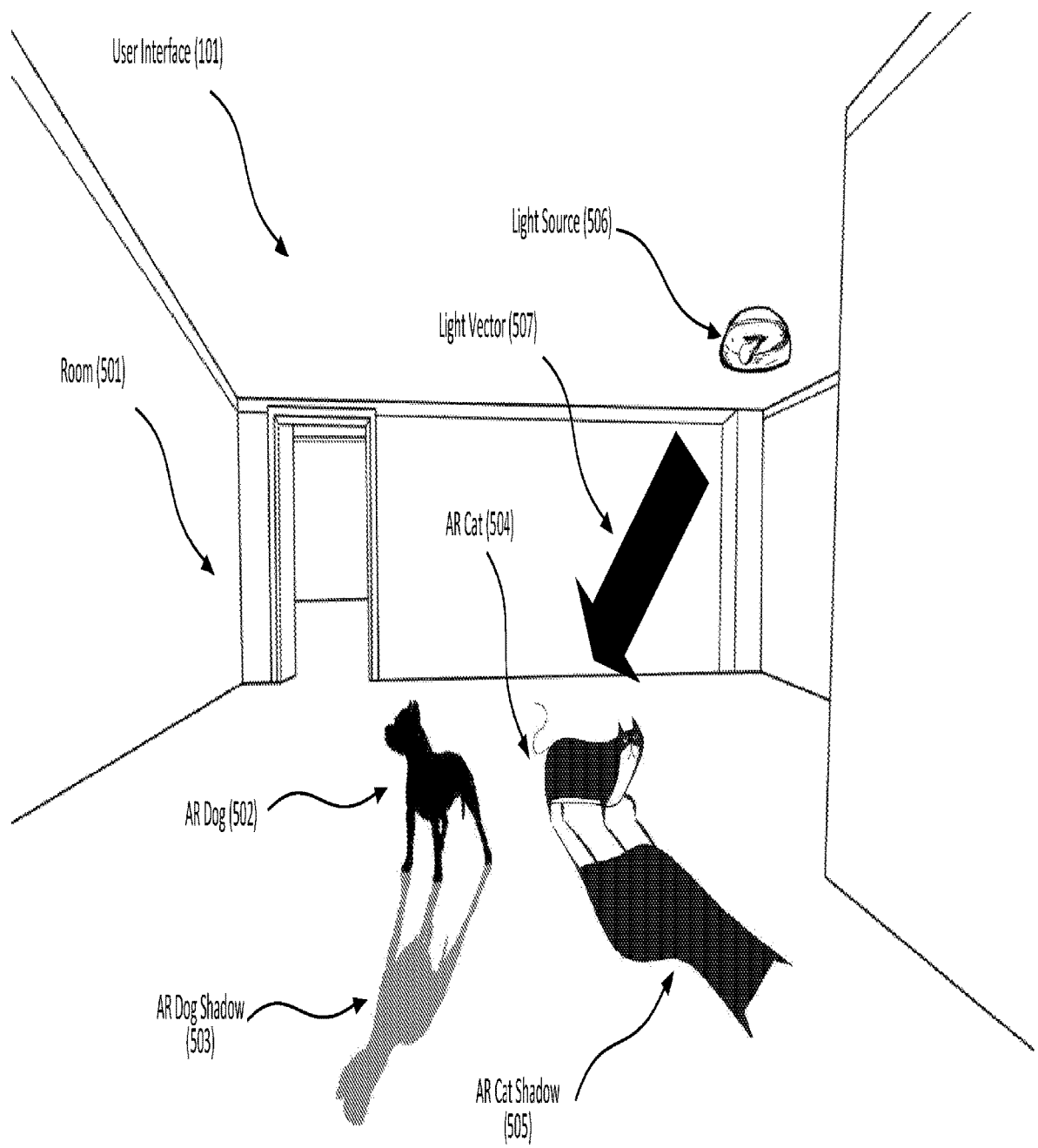
FIG. 5 shows an example human challenge mode in which the application displays augmented reality objects with shadows.

FIG. 5 shows an example human challenge mode in which the application displays augmented reality objects with shadows. In this example embodiment, the user interface 101 displays a room 501 with an augmented reality dog 502 and an augmented reality cat 504. Using the light source detection module, the application can determine that there is a light source 506 in the room 501. The application can determine a location for the light source. The application can also determine a light vector 507, which can specify the direction of the light. Using the location of the light source 506 and/or the light vector 507, the application can determine shadows for augmented reality objects 502 and 504. For example, the application can display an augment reality shadow 503 for the augment reality dog 502. The augmented reality shadow 503 can be consistent with the location of the light source 506 and the light vector 507. The application can also display an augmented reality shadow 505 for the augmented reality cat 504. The augmented reality shadow 505 can be inconsistent with the location of the light source 506 and the light vector 507.

In this example embodiment, a prompt can ask the user to identify the augmented reality objects with the shadows consistent (or inconsistent) with the lighting in the room. In response, the user can select some or none of the augmented reality objects displayed in the user interface. In this example, the augmented reality dog 502 has the consistent shadow and if the user selects this augmented reality object, the human challenge can be completed.

In one example embodiment, the application can display an artificial light source. The application can determine a light vector for the artificial light source. The application can also display a plurality of augmented reality objects in the user interface. Using the location of the artificial light source and/or the light vector, the application can display shadows for the plurality of the augmented reality objects. Some of the shadows can be consistent with the artificial light source and/or the light vector and some can be inconsistent with the artificial light source and/or the light vector. The application can prompt the user to select the augmented reality objects with consistent (or inconsistent) shadows.

Although performance of various tasks relating to some embodiments of the present disclosure are described with respect an application of the smart device, one of ordinary skill in the art recognizes that these tasks can be performed on the backend using a server in communication with the smart device.

In an example embodiment, the application indicates whether image quality of the incoming video stream is unsatisfactory for object recognition or scene recognition purposes. For example, if there is too much light or glare in the video or streaming images that the camera is capturing, the application can indicate to the user that the user needs to move or point the camera in a different direction.

Technical Implementation of the Smart Device or Server

Figure 6:
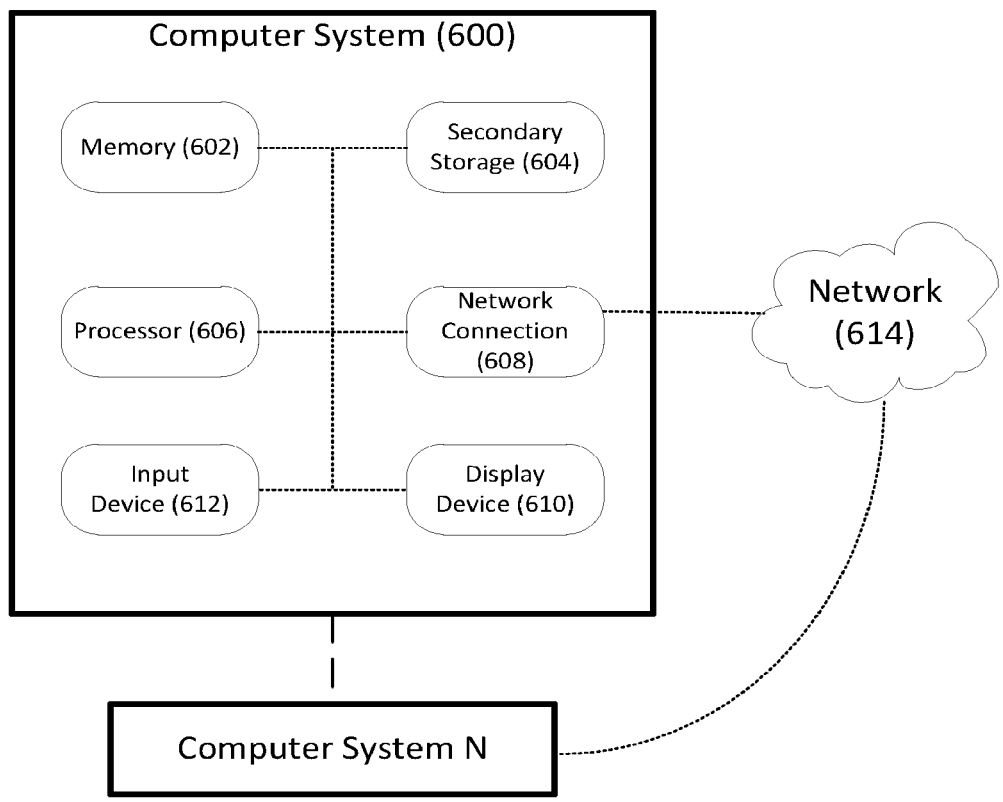
FIG. 6 illustrates exemplary hardware components of a server.

FIG. 6 illustrates exemplary hardware components of a server. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
   displaying a user interface on a cellphone, wherein the user interface is configured to display:
   an application with a login page;
   a button for activating a verification function by selecting a particular virtual reality object; and
   a video feed received from a camera of the cellphone;
   in response to activation of the verification function using the button, receiving the video feed including a plurality of fields of view;
   constructing a three dimensional ("3-D") model based on the plurality of fields of view;
   detecting an object using an object recognition module, a scene using a scene detection module and Global Positioning System ("GPS") coordinates of the cellphone;
   selecting a plurality of virtual reality objects based on the object, the scene and the GPS coordinates;
   displaying the plurality of virtual reality objects in the user interface over the video feed, wherein:
   at least two of the plurality of virtual reality objects are associated with shadows and displayed in two different fields of view; and
   based on the 3-D model and an attribute for at least one of the virtual reality objects, the at least one virtual reality object is displayed on a horizontal surface or a vertical surface;
   prompting selection of the particular virtual reality object of the plurality of virtual reality objects with a correct shadow; and
   in response to selection of the particular virtual reality object, enabling the cellphone to access the application.

2. The method of claim 1, wherein the 3-D model includes a horizontal plane representing a ground.

3. The method of claim 2, wherein the cellphone is configured to display at least one of the plurality of virtual reality objects on the horizontal plane.

4. The method of claim 1, wherein the cellphone is configured to display a different field of view in response to the cellphone being rotated or tilted.

5. The method of claim 1, wherein the selection of the particular virtual reality object includes drag and drop of the particular virtual reality object.

6. The method of claim 1, wherein the selection of the particular virtual reality object includes textual input.

7. The method of claim 6, further comprising determining an intent of the textual input using a natural language processing module.

8. The method of claim 7, further comprising determining whether the intent matches a description for the particular virtual reality object.

9. The method of claim 1, wherein the selection of the particular virtual reality object includes a selection of a plurality of the plurality of virtual reality objects.

10. The method of claim 1, wherein the selection of the particular virtual reality object includes drawing a shape over the particular virtual reality object in the user interface.

11. The method of claim 1, further comprising, in response to the selection of a virtual reality object other than the particular virtual reality object, displaying a second plurality of virtual reality objects over the video feed.

12. The method of claim 11, further comprising, in response to the selection of a virtual reality object other than the particular virtual reality object, prompting selection of a second particular virtual reality object of the second plurality of virtual reality objects.

13. A method for accessing an application comprising:
receiving, at a server, a video feed from a camera of a cellphone including a plurality of fields of view;
constructing a three dimensional ("3-D") model based on the plurality of fields of view;
detecting an object using an object recognition module and a scene using a scene detection module;
receiving Global Positioning System ("GPS") coordinates of the cellphone;
selecting a plurality of virtual reality objects based on the object, the scene and the GPS coordinates;
transmitting the plurality of virtual reality objects, the 3-D model, and one or more shadows for the plurality of virtual reality objects to the cellphone;
based on the 3-D model and an attribute for at least one of the virtual reality objects, transmitting a signal to the cellphone indicating that at least one of the virtual reality objects is displayed on a horizontal surface or a vertical surface;

transmitting, to the cellphone, a prompt requesting a user to select a particular virtual reality object of the plurality of virtual reality objects with a correct shadow; and
in response to receiving the selection of the particular virtual reality object from the cellphone, transmitting a signal to the cellphone, the signal configured to enable the cellphone to access the application.

14. The method of claim 13, wherein the 3-D model includes a horizontal plane representing a ground.

15. The method of claim 13, wherein the selection of the particular virtual reality object includes drag and drop of the particular virtual reality object.

16. The method of claim 13, wherein the selection of the particular virtual reality object includes textual input.

17. The method of claim 16, further comprising determining an intent of the textual input using a natural language processing module.

18. The method of claim 17, further comprising determining whether the intent matches a description for the particular virtual reality object.

19. The method of claim 13, wherein the selection of the particular virtual reality object includes a selection of a second plurality of the plurality of virtual reality objects.

20. The method of claim 13, wherein the selection of the particular virtual reality object includes drawing a shape over the particular virtual reality object.

* * * * *